US012783464B2

(12) United States Patent
Telang

(10) Patent No.: US 12,783,464 B2
(45) Date of Patent: Nov. 3, 2026

(54) DATA MANAGEMENT SYSTEM FOR CONFIDENTIAL INFORMATION

(71) Applicant: Palo Alto Networks, Inc., Santa Clara, CA (US)

(72) Inventor: Nilesh Telang, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/967,135

(22) Filed: Dec. 3, 2024

(65) Prior Publication Data

US 2026/0154235 A1 Jun. 4, 2026

(51) Int. Cl.
*G06F 16/14* (2019.01)
*G06F 16/174* (2019.01)

(52) U.S. Cl.
CPC ........ *G06F 16/152* (2019.01); *G06F 16/1748* (2019.01)

(58) Field of Classification Search
None
See application file for complete search history.

(56) References Cited

U.S. PATENT DOCUMENTS

| | | | | |
|---|---|---|---|---|
| 9,514,312 | B1 * | 12/2016 | Antoun | G06F 16/152 |
| 9,602,531 | B1 | 3/2017 | Wallace | |
| 9,626,332 | B1 | 4/2017 | Panchanathan | |
| 10,372,687 | B1 * | 8/2019 | Armangau | G06F 16/1748 |
| 10,528,367 | B1 | 1/2020 | Liu | |
| 10,713,577 | B1 | 7/2020 | Faruquie | |
| 11,816,575 | B2 | 11/2023 | Gu | |
| 11,989,118 | B1 | 5/2024 | Sutton | |
| 2004/0073617 | A1 * | 4/2004 | Milliken | G06F 21/562 709/224 |
| 2007/0245336 | A1 * | 10/2007 | Lee | G06F 8/658 717/168 |
| 2008/0147662 | A1 * | 6/2008 | Imai | G06F 16/152 |
| 2014/0229698 | A1 | 8/2014 | Sivasubramanian | |
| 2015/0381626 | A1 * | 12/2015 | Barkan | G06F 16/22 726/26 |
| 2017/0237773 | A1 | 8/2017 | Wallace | |
| 2020/0019539 | A1 | 1/2020 | Ni | |
| 2020/0278948 | A1 * | 9/2020 | Kim | G06F 16/137 |
| 2021/0056085 | A1 | 2/2021 | Akerib | |
| 2021/0288659 | A1 | 9/2021 | Ghasemazar | |
| 2021/0319228 | A1 | 10/2021 | Fleischman | |
| 2021/0357364 | A1 * | 11/2021 | Saliba | G06F 21/565 |

(Continued)

OTHER PUBLICATIONS

NPL—Shapira, Y. Shapira, B. Shapira, and A. Shabtai. Content-based data leakage detection using extended fingerprinting. arXiv preprint arXiv:1302.2028, 2013. (Year: 2013).*

(Continued)

*Primary Examiner* — Aleksandr Kerzhner
*Assistant Examiner* — Anugeetha Kunjithapatham
(74) *Attorney, Agent, or Firm* — Van Pelt, Yi & James LLP

(57) ABSTRACT

A consolidated file is created based on a set of data transfer records. A fingerprint that includes a plurality of hashes for the consolidated file is generated. A deduplicated hash index is utilized to determine a similarity between the consolidated file and the plurality of files based on the fingerprint. An action is performed based on the determined similarity.

19 Claims, 10 Drawing Sheets

(56) References Cited

U.S. PATENT DOCUMENTS

| | | | | |
|---|---|---|---|---|
| 2022/0391356 | A1* | 12/2022 | Kraatz | G06F 16/152 |
| 2023/0057692 | A1 | 2/2023 | Wong | |
| 2023/0087778 | A1* | 3/2023 | Borzov | G06F 16/152<br>707/692 |
| 2023/0119183 | A1* | 4/2023 | Wong | G06F 16/137<br>707/822 |

OTHER PUBLICATIONS

Author Unknown, Veritas NetBackup Deduplication Guide, Feb. 18, 2020.

Schleimer et al., Winnowing: Local Algorithms for Document Fingerprinting, SIGMOD 2003, 2003.

* cited by examiner

DATA MANAGEMENT SYSTEM FOR CONFIDENTIAL INFORMATION

BACKGROUND OF THE INVENTION

Entities (e.g. companies, governments, organizations, etc.) maintain databases of files. Some of those files may be confidential files that include one or more secrets associated with an entity. Parties with access to the database (e.g. employees, malicious actors) may attempt to remove portions of or an entire confidential file. For example, an employee may generate a text file, copy and paste some of the text included in the confidential file into the text file, and email the text file to their personal email account. By the time the entity realizes the confidential information has been exfiltrated, the damage may already be done and could be irreversible.

BRIEF DESCRIPTION OF THE DRA WINGS

Various embodiments of the invention are disclosed in the following detailed description and the accompanying drawings.

DETAILED DESCRIPTION

Figure 1A:
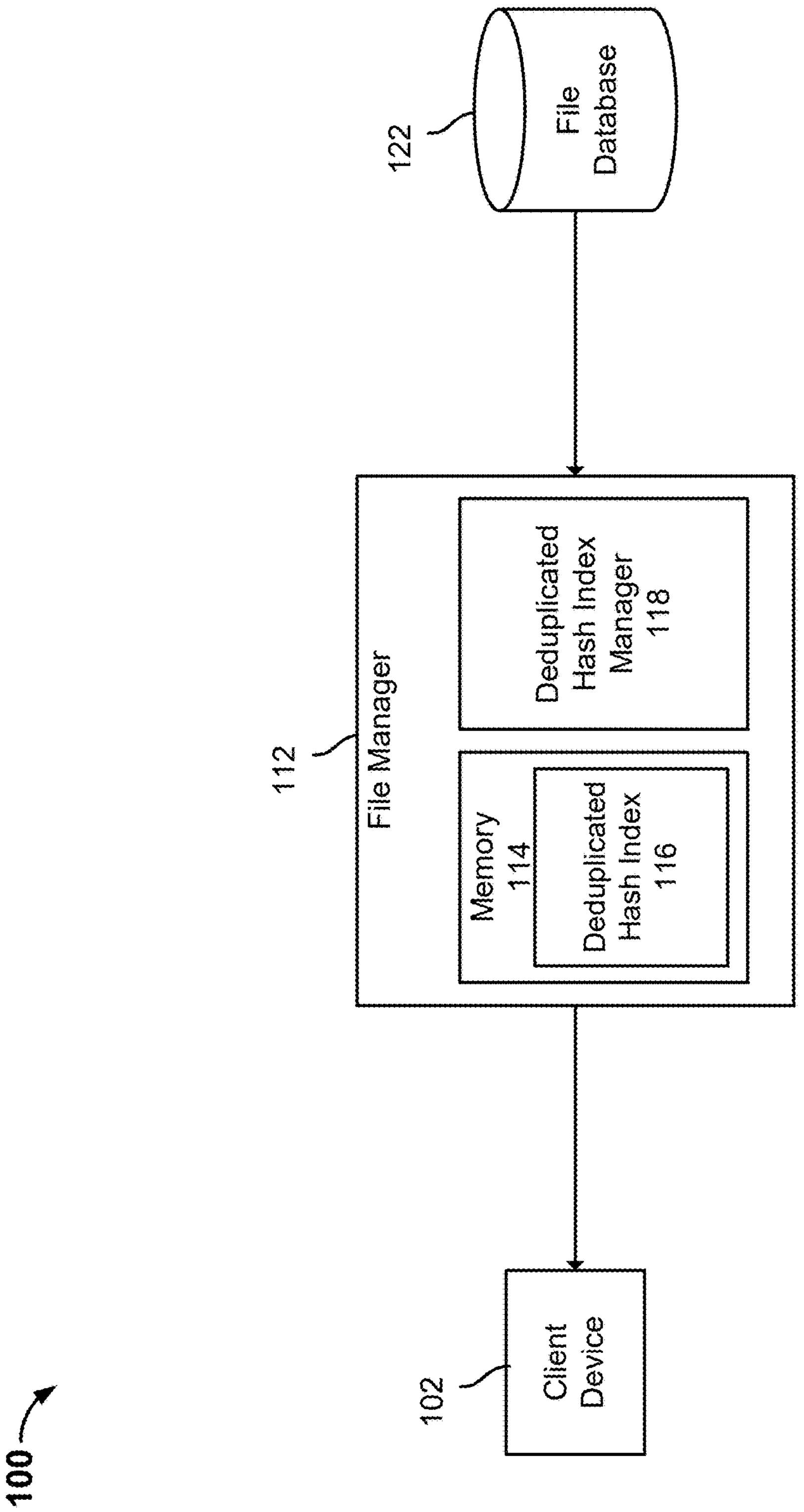
FIG. 1A is a block diagram illustrating a data management system for confidential information in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Entities may store a large number of secrets in a large number of confidential files. A party with access to the files may copy some or all of a confidential file into a text file and exfiltrate the text file. Current solutions may compare the text file to each of the confidential files before the text file is allowed to be exfiltrated. However, such a process is a high latency process because each confidential file is individually compared to the text file.

The systems and methods disclosed herein reduce the latency associated with detecting whether a file includes parts of one or more files (e.g. confidential files associated with an entity). When a party with access (e.g. an employee) to an internal database attempts to exfiltrate data (e.g. remove, share, copy, etc.) from the database, entities may employ the systems and methods disclosed herein to detect whether the file may contain any confidential information (e.g., secrets)

For example, an entity's firewall enhanced with the systems and methods disclosed herein maintains a deduplicated hash index. The deduplicated hash index contains all hashes hash 1, hash 2, hash 3, . . . hash n for all files 1-m. When an actor attempts to exfiltrate a file from the entity, the firewall hashes the file that the user is attempting to exfiltrate into a plurality of hashes. The firewall then compares the plurality of hashes with the hashes included in the deduplicated hash index to determine if there is sufficient similarity between the file and any of the files stored in a database associated with the entity.

Current solutions require that the firewall individually compare the plurality of hashes associated with the file with the plurality of hashes associated with a plurality of files. This is a high latency process, especially when there is more than one file to check (e.g. more than one file being exfiltrated). For example, database may store thousands or millions of files. The systems and methods disclosed herein reduce the latency associated with the comparison by utilizing a deduplicated hash index. Instead of doing n comparisons for n files, the systems and methods disclosed herein utilize the deduplicated hash index to perform a single comparison. The deduplicated hash index may be stored in memory instead of in storage to enable faster comparisons.

An entity includes a database that stores a plurality of files. A file may be confidential or non-confidential. When stored in the database, a file is segmented into a plurality of hashes. For a first file stored in the database, a deduplicated hash index is updated to include all of the hashes associated with the first file. For one or more subsequent files, the plurality of hashes associated with the one or more subsequent files is deduplicated in the deduplicated hash index.

An actor with access to the database may generate and store a file. The stored file is segmented into a plurality of hashes, generating a fingerprint for the file. A similarity between the fingerprint of the file and the plurality of hashes associated with the stored file is determined using the deduplicated hash index. The similarity can be determined using any technique to that determines the similarity between two hashes e.g. winnowing algorithm, k-gram techniques, all-to-all matching etc. In response to a determination that the similarity between the stored file and one of the database files is greater than a particular threshold value, one or more policies are applied to the stored file. The policies may be security policies which prevent the removal of a secret from an entities database. For example, an administrator associated with the entity may be notified when an actor has attempted to remove one or more secrets associated with one or more confidential files from the database. In response to a determination that the similarity between the stored file and the database files is less than a threshold, removal of the stored file is permitted. For example, the stored file may be permitted to be stored on a removable thumb drive or emailed to an email address.

In some scenarios, a party with access to the files on an entity's database may attempt to exfiltrate entire content of a file from the entity's database by copying parts of the file to different files and removing those files on separate occasions. For example, a malicious party may attempt to exfiltrate the data "I found round rings" by copying "Ifo" to File 1, "fou" to File 2, "und" to File 3, etc. such that all the data (e.g. "I found round rings") is copied. The party may then remove each file on a separate occasion. Using this method, a malicious party may be able to exfiltrate the entirety of the data in a file because the similarity of each single file to a deduplicated hash index will not meet a threshold and a file manager will permit removal of each file.

In some embodiments, the exfiltration of data through the use of multiple files is prevented (i.e. piecemeal exfiltration). A database owner tracks ingress and egress data transfers to and from the database. Each data transfer is tracked and stored. A data transfer may be stored with a variety of attributes describing the data transfer, such as tenant, user-entity, ingress/egress, operation time data transfer, file name, etc. The order in which each data transfer occurs is maintained. The data transfers may continue to be recorded and stored for an amount of time set by the database owner. When a data transfer occurs, the data that has been transferred is extracted and stored in a database, such that the data may be retrieved for use in similarity analysis. The association between the data transfer and the stored data is maintained. In some embodiments, the data transfers are filtered where suitable (e.g. filter for only ingress/egress). The files may be sorted in ascending order of operation time and concatenated in ascending order of operation time into a consolidated file. This consolidated file may be used for a similarity search by comparing it to a deduplicated hash index.

The systems and methods disclosed herein enhance the ability to detect similarities between files, such that an entity can detect parts or a whole of any file of a plurality of files in any other file with reduced latency. Furthermore, the systems and methods disclosed herein may prevent the exfiltration of sensitive data before irreversible damage is incurred.

FIG. 1A is a block diagram illustrating a data management system for confidential information in accordance with some embodiments. In the example shown, system 100 includes a client device 102, a file manager 112, and a file database 122. File manager 112 contains memory 114 which contains a deduplicated secrets hash index 116. File manager 112 contains deduplicated hash manager 118. Client device 102 may be a computer, a laptop, a desktop, a server, a tablet, a smart device, or any other computing device. Files database 122 may be any database implemented on any computing device. File database 122 contains one or more files, where each file may contain one or more secrets. In some embodiments, the entire file is a secret. Files may be any data stored in any format (e.g. document file extensible markup language (DOCX), text (txt), comma separated values (CSV), portable document formats (PDF), etc.). Secrets may be any piece of data stored in any format. Secrets may be pieces of data (i.e. parts of a full file). A secret may be confidential or sensitive information pertaining to an entity associated with file database 122. Entities may maintain a database of policies that apply to secrets (e.g. what group is allowed to copy a secret).

In some embodiments, file database 122 forwards a plurality of files to deduplicated hash index manager 118. Deduplicated hash index manager 118 executes a process to update and/or create deduplicated hash index 116. Deduplicated hash index 116 holds information that reflects the plurality of files. In some embodiments, deduplicated hash index 116 is one or more key-value pairs, where the key is a hash, and the value is occurrence data. Occurrence data comprises any information associated with a hash's presence in elements of data, such as a file. Occurrence data may be a group of pieces of data which each indicate the occurrence of the hash in an element of data (e.g. a list of entries, where each entry corresponds to a file).

In some embodiments, an entity that maintains file database 122 may determine which files are represented by deduplicated hash index 116. For example, the entity may decide to only forward files which contain confidential information (e.g. secrets) to deduplicated hash index manager 118. In some embodiments, deduplicated hash index manager 118 receives a file, processes the file, and updates and/or creates deduplicated hash index 116. In some embodiments, deduplicated hash index manager 118 executes process 200.

In the example shown, client device 102 attempts to copy a file stored in file database 122. In some embodiments, in response to being queried for a file, file database 122 forwards the file to file manager 112. File manager 112 checks the file's similarity to deduplicated hash index 116. In some embodiments, this process is performed in memory 114 (i.e. the process is performed utilizing random access memory (RAM)). In some embodiments, in response to a determination that the file exceeds a threshold value of similarity with deduplicated hash index 116, file manager 112 applies security polices to the file. In response to a determination that the similarity threshold value is not exceeded, file manager 112 may permit client device 102 to copy the file.

In some embodiments, in response to a determination that the file exceeds a threshold value of similarity with a particular file represented in deduplicated hash index 116, file manager 114 determines and applies file specific policies to the file. For example, Group A may be the only group permitted to copy information from File A. Thus, if the file exceeds a threshold of similarity to File A and client device 102 does not belong to a member of Group A, then file manager 112 will stop client device 102 from copying information from File A.

Figure 1B:
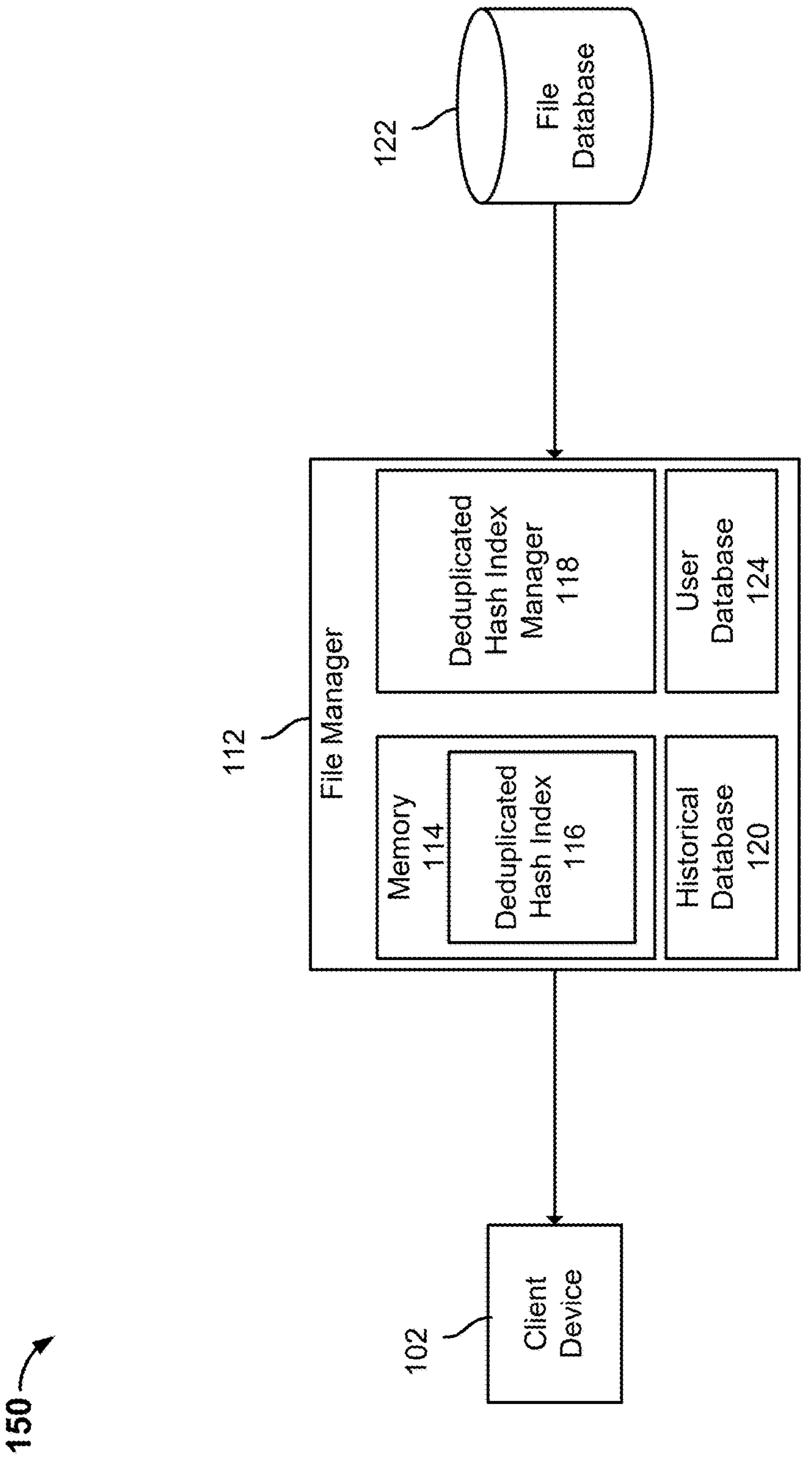
FIG. 1B is a block diagram illustrating a data management system for confidential information in accordance with some embodiments.

FIG. 1B is a block diagram illustrating a data management system for confidential information in accordance with some embodiments. In the example shown, system 150 contains components that are similar to FIG. 1A and are labeled as such. In some embodiments, file manager 112, deduplicated hash index manager 118, memory 114, and deduplicated hash index 116 are configured to perform the same functions as described in FIG. 1A. In some embodiments, historical database 120 stores information indicating data transfers and the data that has been transferred. In some embodiments, user database 124 stores information pertaining to users who have access to file database 122. The data in user database 124 may be used to identify the user associated with client device 102 and determine which users are responsible for each data transfer.

In some embodiments, any time client device 102 transfers data to or from file database 122, the data transfer is tracked and stored in historical database 120 along with the actual data (i.e. the content of the file) that is being transferred. Additionally, the data transfer may be stored with a variety of attributes describing the data transfer, such as tenant (e.g., company 1, company 2 or company 1—engineering, company 1—legal, etc.), user-entity, ingress/egress, operation time data transfer, file name, etc. Historical database 120 may store each data transfer and its associated data, such that the name of the transferred data contains the attributes of the data transfer (e.g. the filename of the transferred data contains the attributes). In some embodiments, the data transfer is recorded as an entry, and the entry provides information that facilitates retrieval of the transferred data.

For example, the file manager 112 may store a data transfer in the following format:

---

<tenant>/<USER-ENTITY-TYPE-ABBREVIATION>-<user entity>/<operation_time_stamp>_<operation_direction>_<file_name>

---

In some embodiments, this format is used to record a data transfer. In this example, <tenant> may identify the entity that owns file database 122 (e.g. "us-company"). <USER-ENTITY-TYPE-ABBREVIATION> may be an abbreviation for the <user-entity> parameter. The <user-entity> may be any information used to identify the party responsible (e.g. client device 102) for the data transfer and may be a variety of identifying attributes such as user-id, email, source Internet Protocol (IP) address, destination IP address, etc. In some embodiments, the user entity is retrieved from user database 124. The <operation_time_stamp> is a time stamp that indicates the time of that the data transfer occurred. The <operation_direction> indicates the direction of the data transfer, such as ingress or egress. In some embodiments, an egress indicates that client device 102 downloads a file from file database 122. In some embodiments, an ingress indicates that client device 102 uploads a file to file database 122. The <file_name> stores any piece of information that can be used to identify the requested file or the file that contains the requested data.

In some embodiments, historical database 120 is configured to store data based on a time-to-live (TTL) paradigm. For example, historical database 120 may be configured to delete all data transfer records and associated files after 10 days (or other time duration) of recording data transfers. This may be desirable because it may require large amounts of memory to store every file transfer that occurs. Furthermore, it may be less likely for files to be incrementally exfiltrated over longer periods of time. However, depending on the needs of the entity which owns the file-database, the TTL can conceivably be as long as the system exists.

In some embodiments, when a data transfer is requested by client device 102, file manager 112 checks for a similarity on deduplicated hash index 116 and also creates a consolidated file. The consolidated file may contain some or all of the files transferred by client device 102, as stored in historical database 120. In some embodiments, when client device 102 performs a data transfer, a new consolidated file is created, a similarity is produced by scanning the consolidated file, actions are performed using the produced similarity, and the consolidated file is deleted. The scan may consist of comparing the consolidated data file on deduplicated hash index 116 in memory 116. In response to a determination that a similarity is greater than a threshold value, file manager 112 is configured to apply security policies. In response to a determination that the similarity is below a threshold value, file manager 112 is configured to permit the removal of the file(s).

Figure 2:
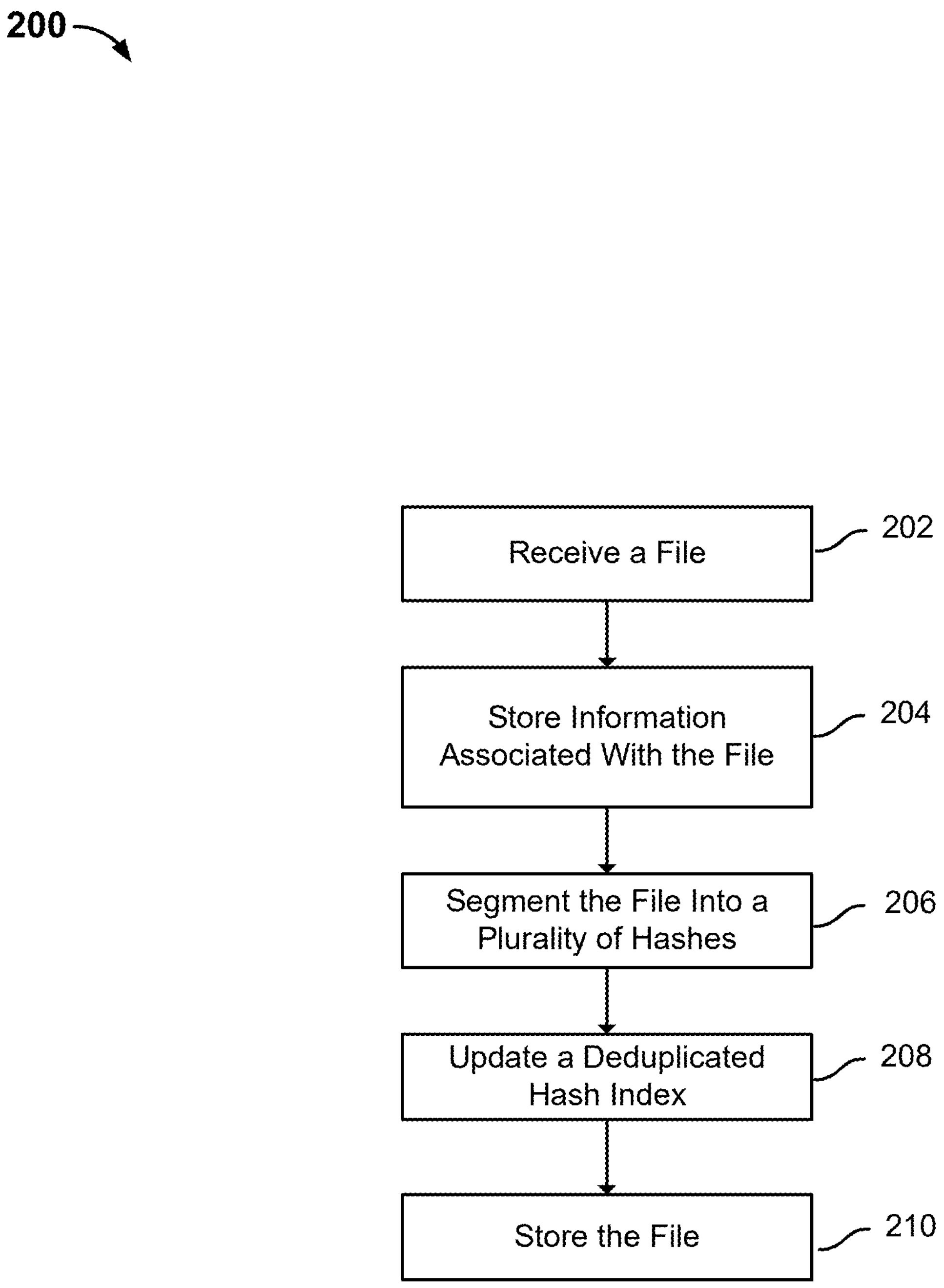
FIG. 2 is a flow diagram illustrating a process to store a file in accordance with some embodiments.

FIG. 2 is a flow diagram illustrating a process to store a file in accordance with some embodiments.

In some embodiments, process 200 is executed by deduplicated hash index manager, such as deduplication hash index manager 118. A deduplicated hash index manager may receive a plurality of files from file database 122 and produce deduplicated hash index 116. In some embodiments, a deduplicated hash index comprises of hashes associated with a plurality of files, where each file may be confidential or non-confidential.

At 202, a file is received. Examples of file types include document file extensible markup language (DOCX), text (txt), comma separated values (CSV), portable document formats (PDF), etc. Process 200 is not necessarily executed on a file. Process 200 may be executed with any amount of data (e.g. a complete file, parts of a file, data that has been copied and pasted, etc.). The any amount of data can be represented as one or more characters (e.g. ASCII characters). In some embodiments, a file is received from file database 122. A file may be confidential or non-confidential.

At 204, information associated with the file is stored. The information may be determined through accessing metadata of the file. Examples of information associated with the file and their data types include file_id (Integer), a unique identifier for the file; group_id (Integer), an identifier referencing the secret group the file belongs; file_name (String), the name of the secret file; and file_hash_count (Integer), the summation of the frequency of all hashes of terms in the secret file. In some embodiments, the file_id is used to access other information associated with the file. Any data relating to a file may be determined and stored (e.g. metadata, classification, type, etc.). In some embodiments, a group_id may be associated with one or more group details, such as group_name (String), a string representing the name of a group; group_actions (JSON), a JavaScript Object Notation defining various actions and checks required to be performed if a file belonging to a group is detected.

In some embodiments, information associated with a file (e.g. group_id, file_name, file_hash_count, etc.) is stored by a file manager (e.g. file manager 112). The file manager can use the information associated with the file to execute a variety of processes, such as determining the percent similarity to a file or applying policies to a file.

In some embodiments, this information is stored within file manager 112, such that when deduplicated hash index 116 returns a file_id, file manager 112 can look up the information associated with the file. For example, a file may have a group_id of G, meaning only members of group G are permitted to copy information from the file. In some embodiments, file_hash_count is used to determine the percentage of similarity that exists between the two files. For example, File A contains five hashes, if this is compared to a piece of data that contains one of the hashes, then the percent of similarity of the piece of data to the file is 20%.

At 206, the file is segmented into a plurality of hashes. In some embodiments, the frequency that each hash appears in the file is stored. The file may be segmented into a list of hashes and their frequencies. For example, a file containing the text "I found round rings" becomes: hash("Ifo")—1, hash("fou")—1, hash("oun")—2, hash("und")—2, hash ("ndr")—2, hash("dro")—1, hash("rou")—1, hash("dri")—1, hash("rin")—1, hash("ing")—1, and hash("ngs")—1, where hash( ) is the application of a hashing function (e.g. SHA, MD5, CRC, Division Method, etc.). In some embodiments, the data is further processed to be stored with more information such as identification of the file.

At 208, a deduplicated hash index is updated. In some embodiments, the file is the first file to be hashed. As a result, the deduplicated hash index is updated to include all of the hashes associated with the file.

In some embodiments, the file is a subsequent file to be hashed. Any time process 200 is executed on a subsequent file (e.g., a file received after the first file), hashes that are present in more than one file may be deduplicated. Deduplication comprises creating only one entry per hash. The deduplicated hash index is stored with occurrence data. Occurrence data may indicate locations of data (e.g. a file) that contains the hash and the frequency of the hash's occurrence in the data. In some embodiments, occurrence data consists of one or more attributes. The occurrence data is updated to reference the subsequent file. The occurrence data already included one or more references to one or more files previously indexed.

The hashes associated with the subsequent file are compared to the hashes included in the deduplicated hash index. The deduplicated hash index is updated to include entries for one or more hashes associated with the subsequent file that are not included in the deduplicated hash index. For the one or more hashes associated with the subsequent file that are already included in the deduplicated hash index, the one or more existing entries are updated to reference the received file (e.g., the occurrence data).

As an illustration, suppose File A contains "I found round rings" and File B contains "You found round". Step 206 may produce the following data: hash("Ifo")—[(1, A)], hash ("fou")—[(1, A)], hash("oun")—[(2, A)], hash("und")—[(2, A)], hash("ndr")—[(2, A)], hash("dro")—[(1, A)], hash ("rou")—[(1, A)], hash("dri")—[(1, A)], hash("rin")—[(1, A)], hash("ing")—[(1, A)], hash("ngs")—[(1, A)], hash ("You")—[(1, B)], hash("ouf")—[(1, B)], hash("ufo")—[(1, B)], hash("fou")—[(1, B)], hash("oun")—[(2, B)], hash ("und")—[(2, B)], hash("ndr")—[(1, B)], hash("dro")—[(1, B)], and hash("rou")—[(1, B)]. In this example, a list is represented by the square brackets and an entry into a list is represented by the parentheses.

In this example, step 208 uses the data from step 206 and produces the following data: hash("Ifo")—[(1, A)], hash ("fou")—[(1, A), (1, B)], hash("oun")—[(2, A), (2, B)], hash("und")—[(2, A), (2, B)], hash("ndr")—[(2, A), (1, B)], hash("dro")—[(1, A), (1, B)], hash("rou")—[(1, A), (1, B)], hash("dri")—[(1, A)], hash("rin")—[(1, A)], hash("ing")—[(1, A)], hash("ngs")—[(1, A)], hash("You")—[(1, B)], hash ("ouf")—[(1, B)], hash("ufo")—[(1, B)]. Note that each hash is deduplicated such that a single look up of the hash will indicate each file the hash is present in and its frequency in the file. In some embodiments, each entry contains occurrence data associated with the hash.

In some embodiments, the deduplicated hash index indicates a sequence of the hashes associated with a file.

At 210, the file is stored.

Figure 3:
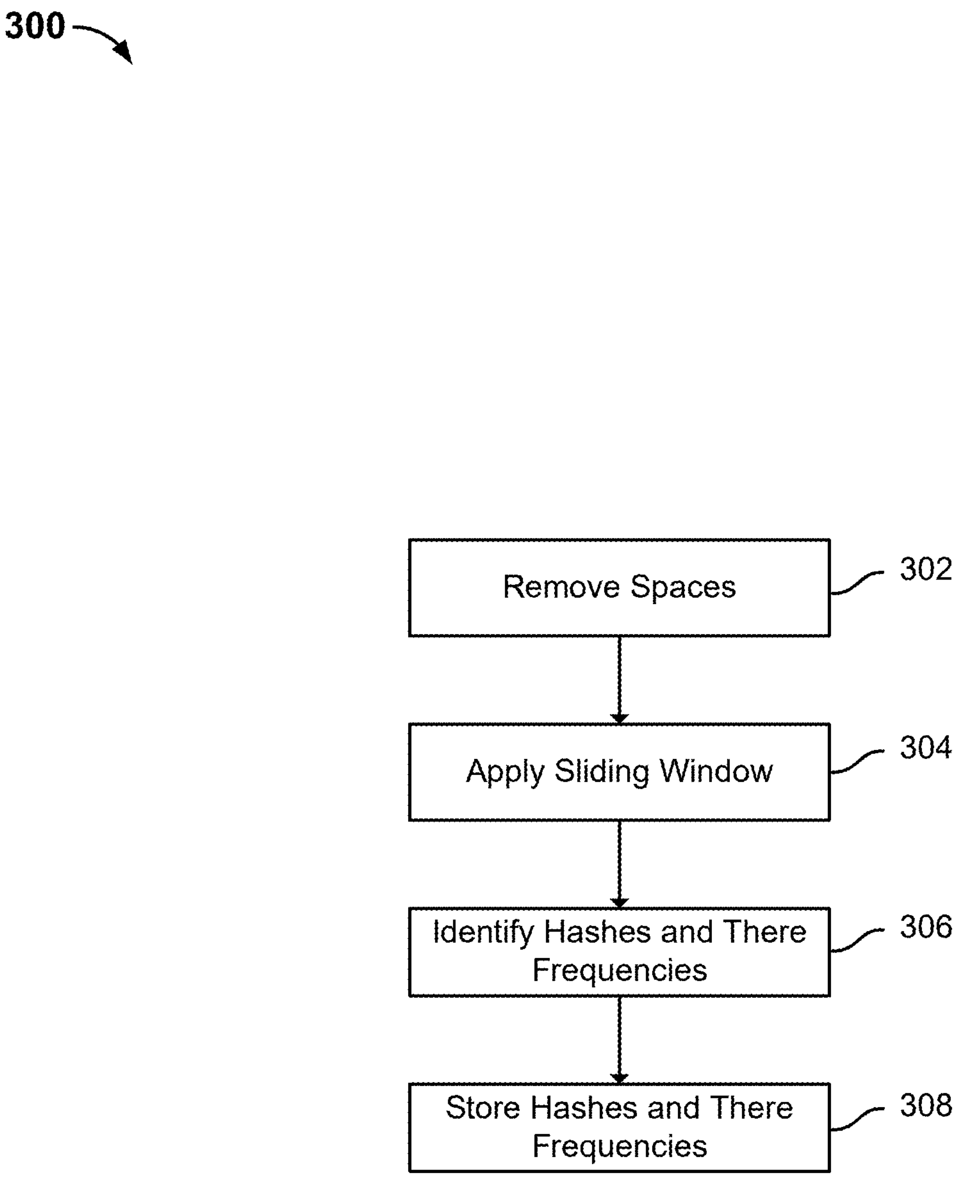
FIG. 3 is a flow diagram illustrating an example process to segment an amount of data into a plurality of hashes in accordance with some embodiments.

FIG. 3 is a flow diagram illustrating an example process to segment a file into a plurality of hashes in accordance with some embodiments. Process 300 may be implemented by a file manager, such as file manager 112. In some embodiments, a component within file manager 112 executes process 300, such as deduplicated hash index manager 118. In some embodiments, process 300 is used to execute some or all of step 206 of process 200. Process 300 may be executed on any amount of data represented as one or more characters (e.g. ASCII characters).

At 302, spaces within a file are removed. In some embodiments, spaces include any character representation of whitespace (e.g. space, newline, tab, paragraph, etc.). For example, the text "I found round rings" is transformed into "Ifoundroundrings".

At 304, a sliding window technique is applied. In a sliding window technique, a window of size n is moved along one or more elements, such that subsets of the elements of the same length are continuously produced. Each subset of size n (i.e. the window) is stored in a storage data structure. For example, if a sliding window of size 3 is applied to "Ifoundroundrings", then the following subsets are produced and stored: "Ifo", "fou", "oun", "und", "ndr", "dro", "rou", "oun", "und", "ndr", "dri", "rin", "ing", "ngs".

At 306, the hashes and their frequencies are identified. The one or more subsets of characters are deduplicated and hashed. Referring back to the example, the following hashes and their frequencies are produced: hash("Ifo")—1, hash ("fou")—1, hash("oun")—2, hash("und")—2, hash ("ndr")—2, hash("dro")—1, hash("rou")—1, hash("dri")—1, hash("rin")—1, hash("ing")—1, and hash("ngs")—1.

At 308, the hashes and their frequencies are stored in the deduplicated hash index. Occurrence data, such as one or more attributes associated with the hash, may be stored with the hash. Occurrence data may be converted into a particular data format for storage. In some embodiments, the data is stored as a hash enabled data structure (e.g. hash table, key-value pair, map, dictionary, etc.) where the hash is a key, and the value is the occurrence data, such as one or more attributes associated with the hash.

For example, the data may be stored such that a hash_id (Long) (i.e. the hash) corresponds to a secret_file_occurence_data(List<Integer>) (i.e. occurrence data). To illustrate, the hash of a subset (e.g. hash("oun")) may be stored as hash_id(Long). Long is a JAVA™ primitive datatype but Long may be any other datatype (e.g. int_32t, uint32_t, unsigned int, unsigned long, etc.).

In this example, secret_file_occurence_data (List<Integer>) is a List of Integers where each integer encodes occurrence data associated with hash_id(Long). Both List and Integer are JAVA™ primitive data types. In some embodiments, a single entry into the List (i.e. a single Integer) encodes both the identification of the hash's source (e.g. a file_id) and the frequency that the hash occurs within the file. For illustrative purposes, suppose the text "I found round rings" is the contents of a file with a file_id of A. At step 308, occurrence data that indicates that hash("oun") is found in File A with a frequency of 2 is stored. This information may be represented as hash("oun")—[(2, A)] where a list is represented by the square brackets and an entry into the list is represented by the parentheses. Note, both the file_id A and the frequency 2 are stored as a single Integer.

As an illustration, assuming a 4 byte integer, the first 16 bits encode a file identifier, and the next 16 bits encode the frequency of the hash within the file. The file identifier may be any string of characters that identify the file. The file identifier may be file_id. The amount of memory may be adjusted to hold the identities of any number of files by increasing the memory size of the integer (e.g. using an 8 byte integer instead of a 4 byte integer).

In some embodiments, one or more entries into the list indicate that the hash occurs in one or more files. In some embodiments, each entry is associated with a particular file. In some embodiments, the list is appended by process 400. The List datatype may be other data types, e.g. array, vector, etc. The entries of the list (e.g. the Integer) may be any data type (e.g. an integer, double, float, etc.) that can be loaded into random access memory (RAM). Encoding the data in a basic data type significantly reduces the amount of memory required for holding the data in RAM.

Figure 4:
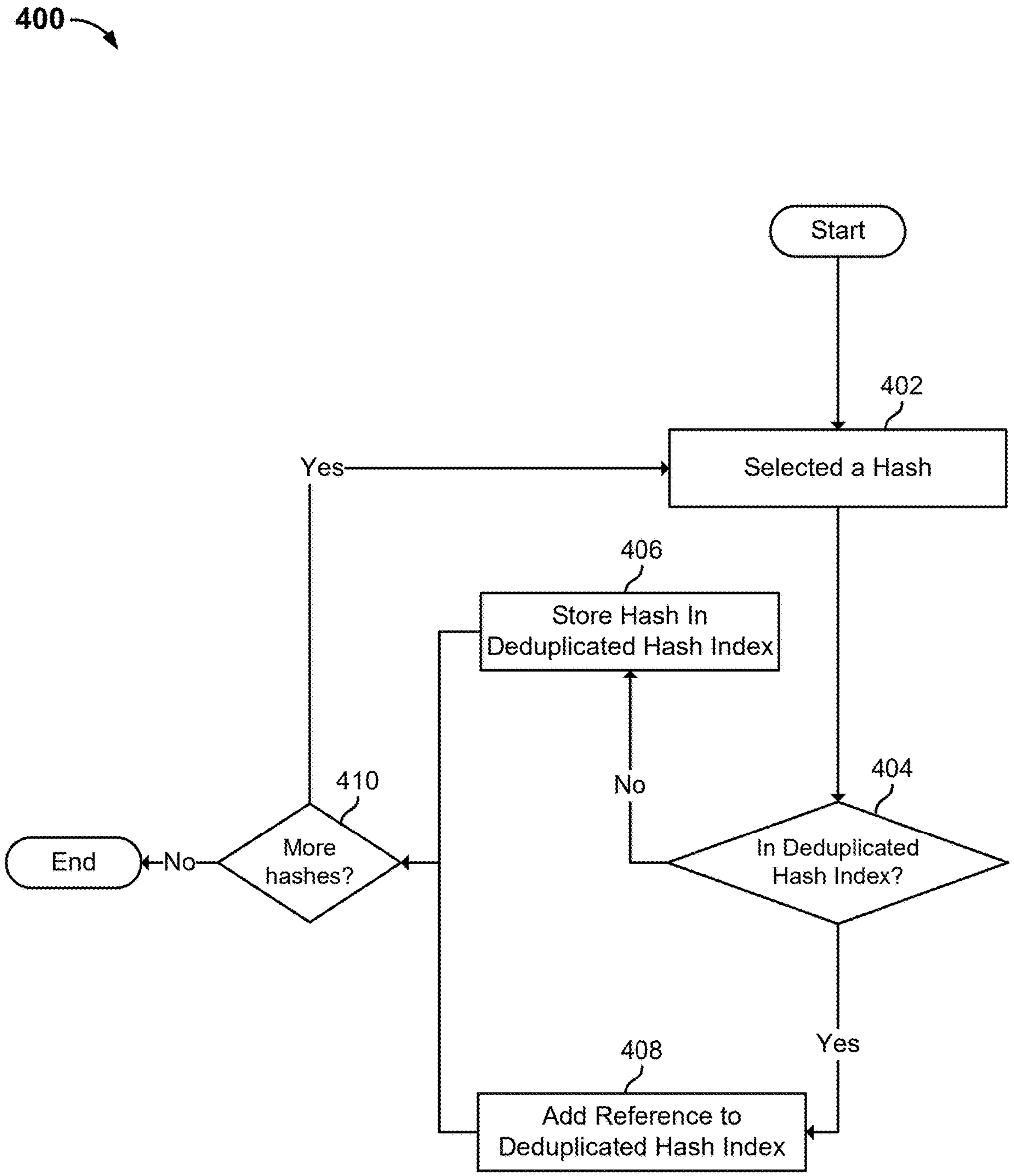
FIG. 4 is a flow diagram illustrating a process to update a deduplicated hash index in accordance with some embodiments.

FIG. 4 is a flow diagram illustrating a process to update a deduplicated hash index in accordance with some embodiments. Process 400 may be implemented by a file manager, such as file manager 112. In some embodiments, a component within file manager 112 executes process 400, such as deduplicated hash index manager 118. In some embodiments, process 400 is implemented to perform some or all of step 208 of process 200.

At 402, a hash is selected from a plurality of hashes. In some embodiments, the hash is selected from the hashes and frequencies stored by step 308. In some embodiments, the hash is directly forwarded by process 300. The hash may be sequentially or randomly selected/received from the plurality of hashes associated with the file. In some embodiments, a first hash of a plurality of hashes is selected. In some embodiments, one or more subsequent hashes of the plurality of hashes is selected.

At 404, a deduplicated hash index is checked to see if it contains an entry for the hash. In some embodiments, the deduplicated hash index does not contain an entry for the hash because the deduplicated hash index is empty. In some embodiments, the deduplicated hash index does not contain an entry for the hash because a file that includes the hash has not been previously stored in a database.

In response to a determination that there is an entry for the hash, process 400 proceeds to 408. In response to a determination that there is not an entry for the hash, process 400 proceeds to 406. In some embodiments, this check occurs in constant computation time as the deduplicated hash index is stored in a hash enabled data type (e.g. dictionary, map, hash table, etc.).

At 406, the hash is stored in the deduplicated hash index. In some embodiments, occurrence data is stored with the hash. The occurrence data may include an identifier for the file that contains the hash and the frequency of the hash within the file. The occurrence data may be encoded as an integer or any primitive data type.

For example, step 406 may store hashes such that a hash_id(Long) corresponds to a secret_file_occurence_data (List<Integer>). The hash_id(Long) may contain the hash while the secret_file_occurence_data(List<Integer>) contains an Integer that encodes for occurrence data, such as one or more source file identifications (e.g. file_id) and frequencies. In some embodiments, occurrence data is created by a previous process (e.g. process 300). In some embodiments, the List contains a single entry because this is the first observed occurrence of the hash.

At 408, a reference to the hash is added to the deduplicated hash index. Process 400 may proceed to 408 when the hash is found in a second file after being found in a first file. In some embodiments, a second integer which encodes the second file and the frequency of its occurrence in the file is appended to a list. For example, an integer that encodes information associated with the hash, such as occurrence data, may be appended to secret_file_occurence_data (List<Integer>). The Integer may encode for a source file identification (e.g. file_id) of the second file and the frequency of the hash in the second file. Step 408 is reached upon the determination that a hash in the deduplicated hash index occurs in any subsequent file (e.g. the third file, fourth file, fifth file, etc.).

At 410, it is determined whether there are any more hashes to analyze. In response to a determination that there are no more hashes to analyze, process 400 ends. In response to a determination that there are one or more hashes to analyze, process 400 returns to step 402. In some embodiments, the determination that there are no more hashes to analyze is reached when every hash that has been stored by process 300 has been analyzed. The determination may also be reached when process 300 ceases to forward any more hashes. In some embodiments, when process 400 ends, a deduplicated hash index that represents a plurality of files is created. The deduplicated hash index may be used to compare the hash of any data and determine the data's similarity to one or more of the plurality of files.

In some embodiments, process 400 is performed in parallel by a plurality of workers for a plurality of hashes associated with a file. This reduces the amount of time needed to update the deduplicated hash index for the file.

Figure 5:
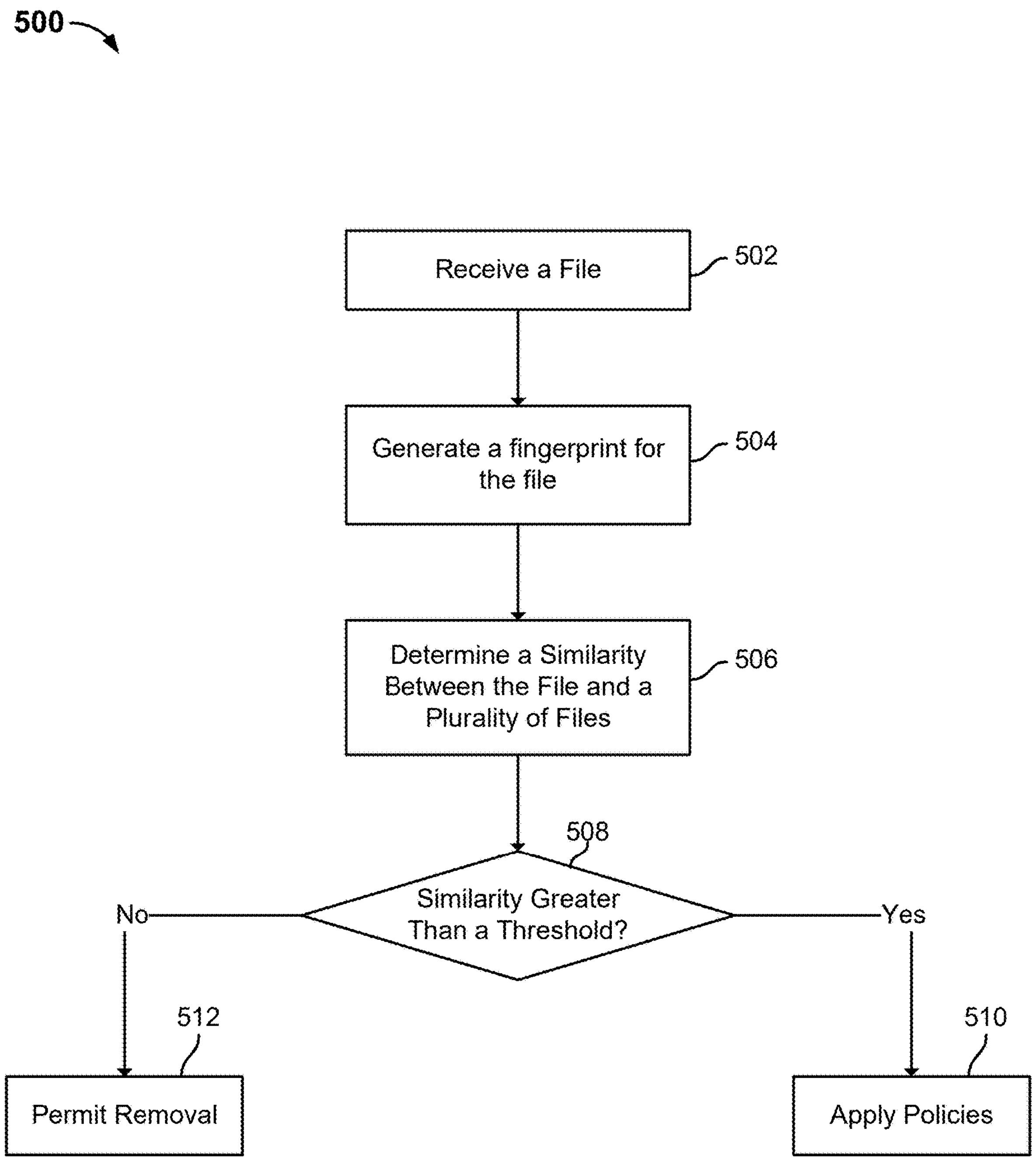
FIG. 5 is a flow diagram illustrating a process to apply policies to a file in accordance with some embodiments

FIG. 5 is a flow diagram illustrating a process to apply policies to a file in accordance with some embodiments. In some embodiments, process 500 is executed on a file manager, such as file manager 112.

At 502, a file is received. In some embodiments, the file is received when a client device, attempts to copy a file in a file database, such as file database 112. The client device may be attempting to store, remove, copy and paste, exfiltrate, etc. the file upon accessing it. The file may be any piece of data of any size. The client device may be attempting to copy any amount of data that is stored in the file database (e.g. parts of a file, a whole file, multiple files, etc.).

At 504 a fingerprint for the file is generated. A fingerprint of a file may consist of a plurality of hashes that comprise the file and the frequency with which each hash occurs in the file. In some embodiments, the fingerprint of the file is generated by process 300. Suppose a client attempts to copy "found round" or copy from a file containing the data "found round". After step 504, a fingerprint of the file will contain hash("fou")—1, hash("oun")—2, hash("und")—2, hash("ndr")—1, hash("dro")—1, hash("rou")—1. In some embodiments, step 504 produces data such that each hash can be compared to a deduplicated hash index.

At step 506, a similarity between the file and a plurality of files is determined. The similarity reflects a comparison between the file and a plurality of files. The similarity may be determined by comparing the fingerprint to the plurality of hashes stored by a deduplicated hash index. The comparison may be performed in the memory of a file manager, such as memory 114 of file manager 112. In some embodiments, a check on a deduplicated hash index returns occurrence data associated with a hash.

In some embodiments, a comparison between hashes can be determined using any technique to that determines the similarity between two hashes e.g. winnowing algorithm, k-gram techniques, all-to-all matching etc.

In some embodiments, information associated with the similarities of each hash are stored in an intermediate data store (e.g. the similarities of a hash in a file of file database 122). In some embodiments, the frequency of the hash in the file is stored. For example, suppose, the file received at 502 is File Z, if File Z has hashes 1-n, the intermediate data store stores the frequency of the hash in File Z and an entry for the similarity data for each hash 1-n. Each entry of similarity data contains similarities to a set of files. In some embodiments, similarity data reflects occurrence data of the hash in a file.

In some embodiments, the hash does not appear in any file, thus there is no entry in the deduplicated hash index.

Similarity data may comprise of one or more attributes. Examples of similarity data attributes include, secret_file_id, an identification of the file that the hash is similar to; match_frequency, a sum of the frequency of all matched terms; percentage_match, the percentage of matched terms frequency, to total frequency. In some embodiments, the percentage_match is determined at least in part by using information associated with the file, such as file_hash_count, that has been stored at a prior time. Information associated with the file may be available on a device that is executing process 500 (e.g. file manager 112).

As an illustration, suppose step 506 is executed on a File Z that contains the phrase "found round" and the plurality of files consists of File A and File B which contain "I found round rings" and "You found round", respectively. After step 506 the intermediate data store may contain the following data for File Z's similarity: hash("fou")—1—[(A, 1, 7%), (B, 1, 9%)], hash("oun")—2—[(A, 2, 14%), (B, 2, 18%)], hash("und")—2—[(A, 2, 14%), (B, 2, 18%)], hash("ndr")—1—[(A, 2, 14%), (B, 1, 9%)], hash("dro")—1—[(A, 1, 7%), (B, 1, 9%)], and hash("rou")—1—[(A, 1, 7%), (B, 1, 9%)].

In other words, if a hash included in the fingerprint matches one of the entries of the deduplicated hash index, an intermediate data store is updated to include one or more entries. Each of the one or more entries corresponds to a file of a plurality of files stored in a database that includes the hash. An entry for a matched file includes an identifier of the file, a sum of the frequency of all matched terms between the fingerprint and the hashes associated with the matched file, and a percentage match of the matched frequency terms (e.g., the fingerprint matched X tokens out of a possible number of Y tokens). The entry for the matched file is updated as there are more and more matches between the fingerprint and the hashes associated with the matched file.

For example, a first hash included in the fingerprint may match a first hash included in a first file. The intermediate data store is updated to include a first entry for the first file. The first entry indicates an identifier associated with the file (e.g., filename), a match frequency (e.g., the number of times the first hash appears in the first file), and a percentage match (e.g., number of hashes that matched compared to the total number of hashes in the file). In this example, the entry is updated to be [(File 1, 1, 14%)]. The "1" indicates that the first hash appeared once in "File 1." The "14%" indicates that one token has matched out of a total of seven tokens. A second hash included in the fingerprint may match a second hash included in the first file. The first entry is updated. In this example, the entry is updated to be [(File 1, 6, 85%)]. The "6" indicates that the second hash appeared five times in "File 1." The "85%" indicates that six tokens out of seven tokens matched.

In some embodiments, a sequence of the hashes associated with the fingerprint is compared to a sequence of the hashes associated with a file included in the deduplicated hash index.

At step 508, it is determined whether the similarity is greater than a threshold. In some embodiments, the intermediate data store is analyzed to make this determination. Referring back to the example of File Z, A, and B, File's Z similarity may be determined by summing the percent similarities to every file that is represented in the deduplicated hash(e.g. both File A and B). In some embodiments, the similarity threshold is a general threshold (e.g., the same for every file). For example, the similarity may be greater than a threshold value if File Z's similarity to File A is higher than a threshold value (e.g. if the sum of File Z's similarity to File A is over 50%). Because the method maintains information denoting the source of each hash, step 508 can be applied with granularity associated with the database files (e.g. File A and B).

In some embodiments, the similarity threshold is specific to the document (e.g., the similarity threshold for a first document is different than the similarity threshold for a second document). In some embodiments, the similarity threshold is based on an owner associated with the document. In some embodiments, the similarity threshold is based on a group to which the file belongs and a policy associated with the group.

In some embodiments, a comparison between the sequence of hashes associated with the fingerprint and a sequence of hashes associated with a file is greater than a similarity threshold. In some embodiments, a comparison between the sequence of hashes associated with the fingerprint and a sequence of hashes associated with a file is not greater than a similarity threshold.

In response to a determination that a similarity is greater than a threshold, process 500 proceeds to process 510. In response to a determination that a similarity is not greater than a threshold, process 500 proceeds to 512.

At 510, one or more policies are applied. Policies may refer to security policies, such as preventing copying from a file. In some embodiments, the application of policies prevents a client device (e.g. client device 102) from exfiltrating a piece of data from a file database (e.g. file database 122). In some embodiments, policies may comprise of read, write, and execute policies. For example, an owner of a file (e.g. an entity) may configure a file's policies such that one or more users is restricted from reading, writing, or executing the file.

In some embodiments, policies are specific to a file and may be determined using information associated with a file that is stored on a device executing process 500 (e.g. file manager 112). For example, a group_id may be used to determine if a user within a certain group is permitted access to the file. Any information associated with the file can be used to apply policies. In some embodiments, any action or check may be performed on a file. For example, the actions and checks defined by a group_actions (JSON).

In some embodiments, a policy indicates an administrator or other user is to be notified when the similarity threshold is greater than the threshold.

At step 512, removal is permitted. In some embodiments, a file manager permits a client device to remove a part or a whole of a file from a file database. In some embodiments, the client device is attempting to copy and paste potentially sensitive information from an entity's file database. Step 512 may permit this action. Step 512 may permit any action pertaining to accessing the file, such as reading, writing, executing, etc.

Figure 6:
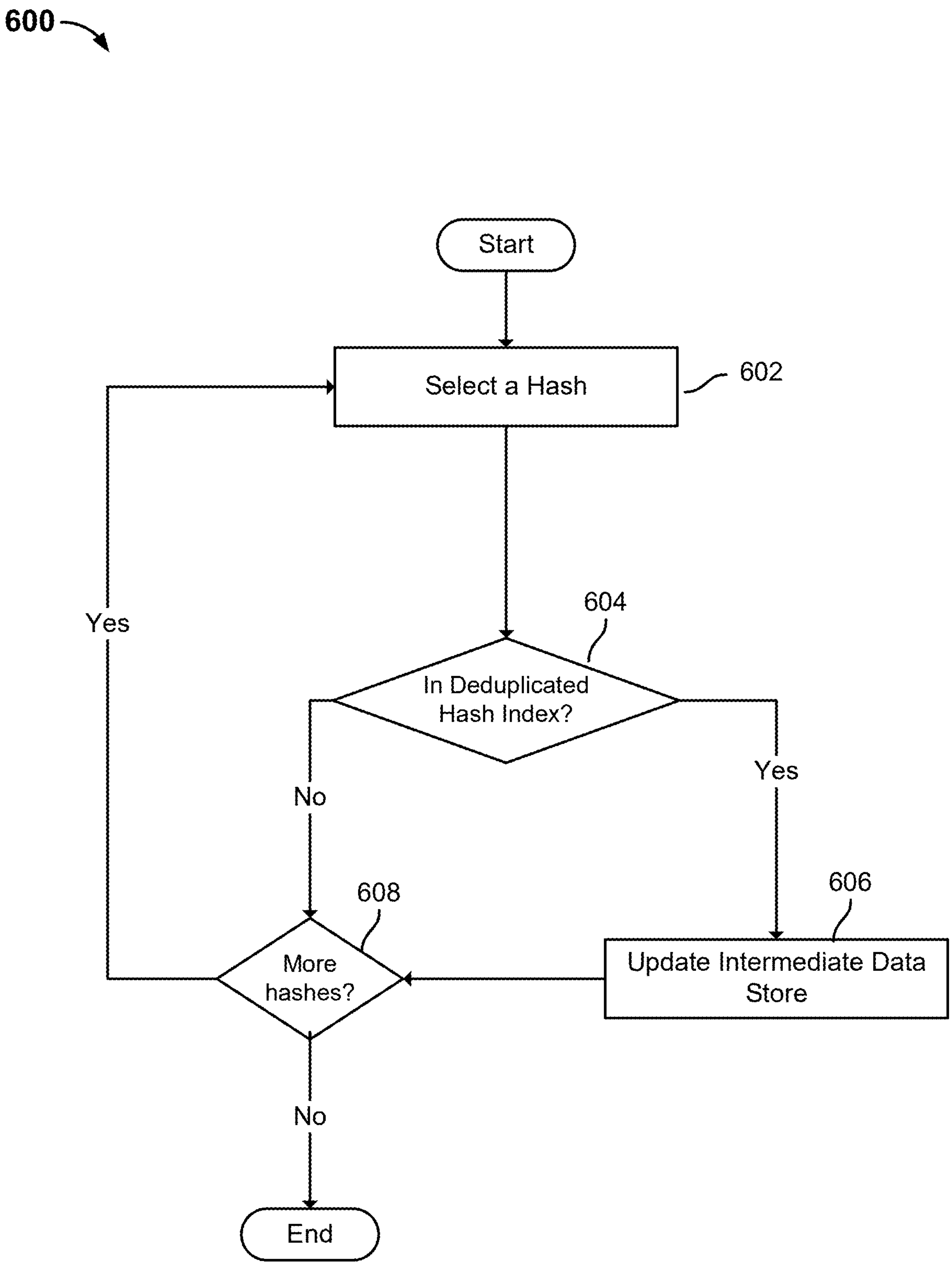
FIG. 6 is a flow diagram illustrating a process to determine a similarity between a file and a plurality of files in accordance with some embodiments.

FIG. 6 is a flow diagram illustrating a process to determine a similarity between a file and a plurality of files in accordance with some embodiments. In some embodiments, process 600 is implemented to perform some or all of step 506. In some embodiments, process 600 is executed on a file manager, such as file manager 112. In some embodiments, data produced by process 600 (e.g. intermediate data store) is stored on the file manager.

At step 602, a hash is selected. The hash may be selected from a group of hashes that represent a file. A fingerprint of a file may provide the hashes for the file. The hash may be sequentially or randomly selected/received from the plurality of hashes associated with the file. In some embodiments, a first hash of a plurality of hashes is selected. In some embodiments, one or more subsequent hashes of the plurality of hashes is selected.

At 604, a deduplicated hash index is checked to see if it contains an entry for the hash. In some embodiments, the deduplicated hash index does not include the entry for the hash. In some embodiments, the deduplicated hash index contains an entry for the hash information associated with the hash(e.g. occurrence data). In some embodiments, the hash is looked up on the deduplicated hash index.

Upon a lookup, the deduplicated hash index will return information associated with the hash, such as occurrence data. In some embodiments, the information associated with the hash contains one or more identifiers (e.g. file_id) of locations that contain the hash and one or more frequencies. In some embodiments, the location is a file, however, the location may be any group of data. Thus, any piece of data can be checked for similarity to the plurality of hashed data that are stored within the deduplicated hash index. Further, this process occurs in RAM, thus greatly reducing the latency of such a comparison.

In response to a determination that there is an entry for the hash, process 600 proceeds to 606. In response to a determination that there is not an entry for the hash, process 600 proceeds to 608.

At 606, an intermediate data store is updated. The intermediate data store may be updated with data that is computed. The intermediate data store may contain entries of a hash corresponding to similarity data. In some embodiments, the intermediate data store is updated by creating an entry for the hash and computing similarity data. In some embodiments, the similarity data is computed using frequency data stored with the hash and occurrence data stored in the deduplicated hash index.

Referring back to the example of File Z, A and B. At 602, data which indicates a hash within File Z and it's frequency is selected, such as hash("und")—2. This data may be retrieved from File Z's fingerprint. At 604, the selected hash is queried on a deduplicated hash index. In this example, the deduplicated hash index will return the following data: hash("und")—[(2, A), (2, B)]. At step 606, similarity data may computed using the information produced by the process and information associated with a file (e.g. file_hash_count). The intermediate data store is updated with an entry that indicates the hash and its similarity data. In this example, the intermediate data store will be updated with the following data: hash("und")")-2-[(A, 4, 28%), (B, 4, 36%)].

At 608, it is determined whether there are any more hashes to select. In response to a determination that there are no more hashes to select, process 600 ends. In response to a determination that there are one or more hashes to analyze, process 600 returns to step 602. In some embodiments, when process 600 ends an intermediate data store is created. In some embodiments, the intermediate data store is analyzed at step 508 to determine if a similarity is greater than a threshold.

Figure 7:
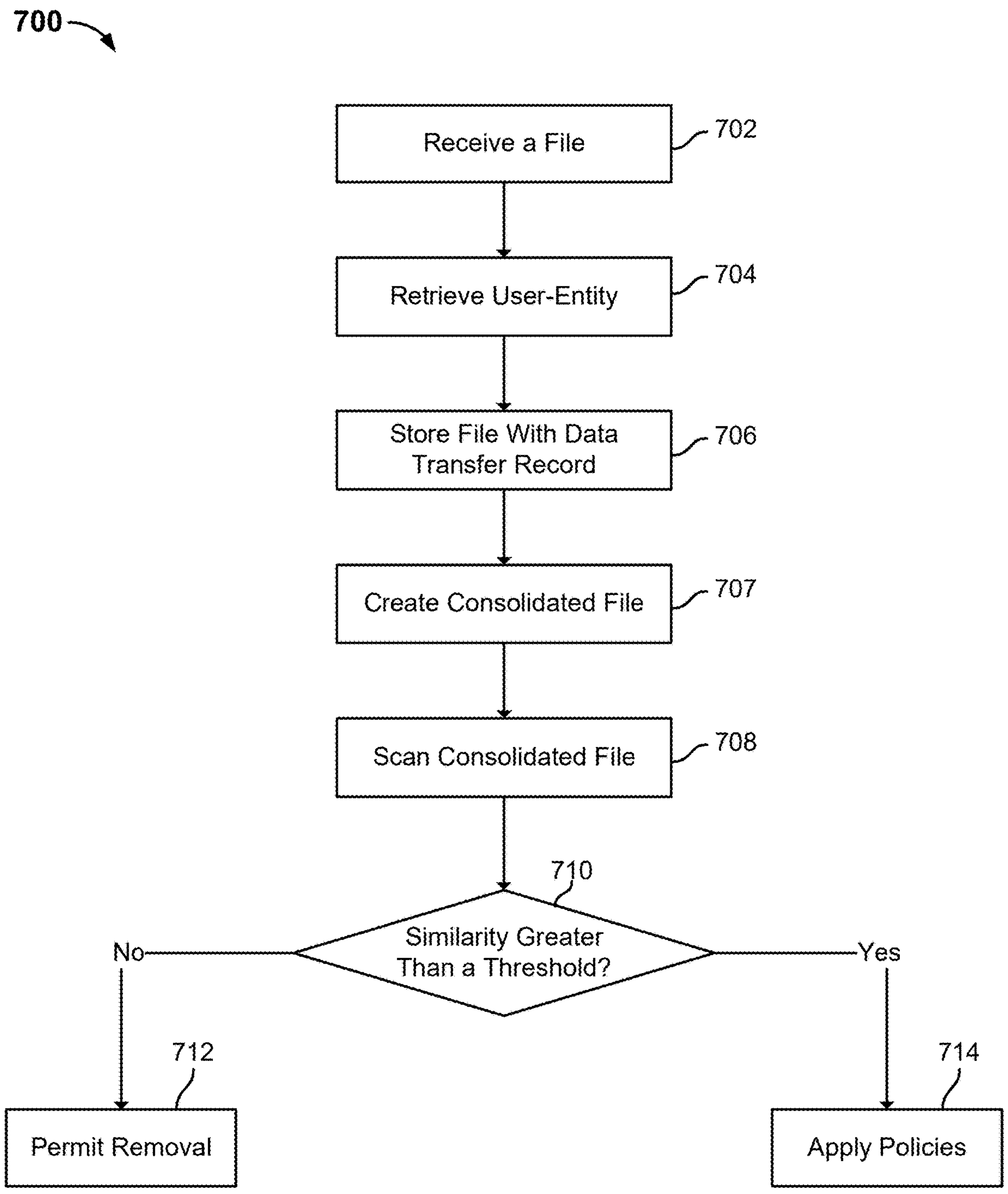
FIG. 7 is a flow diagram illustrating a process to apply policies to a file in accordance with some embodiments.

FIG. 7 is a flow diagram illustrating a process to apply policies to a file in accordance with some embodiments. In some embodiments, process 700 is executed on a file manager such as file manager 112.

In some embodiments, process 700 proceeds simultaneously alongside process 500. For example, a file manager may receive a file and determine whether to apply policies using both process 500 and 700. Upon a determination by either processes 500 or 700 that policies should be applied, then policies are applied. Upon a determination by both processes 500 and 700 that policies should be applied, then policies are applied.

At 702, a file is received. In some embodiments, the file is received when a client device attempts to copy a file in a file database. The client device may be attempting to store, remove, copy and paste, exfiltrate, etc. the file upon accessing it. The file may be any piece of data of any size. The client device may be attempting to copy any amount of data that is stored in the file database (e.g. parts of a file, a whole file, multiple files, etc.).

For example, suppose a client device is attempting to exfiltrate the data "I found round rings" by copying "Ifo" to File 1, "fou" to File 2, "und" to File 3, etc. such that all the data (e.g. "I found round rings") is copied. The client device may then remove each file on a separate occasion.

At 704, a user-entity is retrieved. The user-entity is information that identifies the client device associated with the data transfer at step 702. In some embodiments, the user-entity is retrieved from a user database. Examples of information that may constitute a user-entity include source-IP, destination-IP, user email, unique user-ID, etc. In some embodiments, the user-entity is known by a file manager when a client device makes a request. For example, if file manager is configured to use the source-IP as the user-entity, then a data transfer request that contains the client device's source-IP, will provide the user-entity. In some embodiments, the user-entity is determined by information known through the data-transfer request. For example, the user-entity may be a company email that can be determined by querying the source-IP on the network packet on a user database (i.e. where the user database stores associations between IP's and company emails). The user-entity may be used to look up all of the data transfers by a specific client device stored within a historical database.

At 706, a file is stored with the associated data transfer record. In some embodiments, the file name of the file in storage is a combination of the user-entity and data attributes associated with the requested data transfer. Examples of attributes that are stored with a data transfer operation in the data transfer record include, tenant, user-entity, ingress/egress, operation time data transfer, file name, etc.

In some embodiments, the data transfer record is the name of a file and the stored file. For example, the historical database may store a set of files where the names/paths of the files contain the attributes associated with the data transfer. At a later time, the historical database may be searched for an attribute and each file that conforms to that attribute may be found.

For example, suppose a client device, file manager, and file database are all part of a company's network. The company, "us-company", identifies its users by a user email.

A user email may be used as a user-entity. Again, the client device is attempting to exfiltrate the secret data "I found round rings." Suppose a client device associated with the company email "mal-user-99" (herein referred to as mal-user-99) attempts to egress File 1.txt which contains "Ifo". The file manager may store File 1.txt with a filename such as: us-company/EMAIL-mal-user-99-company.com/2024-10-01T14:46:22.001Z_DOWNLOAD_File 1.txt. The time of the data transfer, the direction of the data transfer, and the original filename of the file (File 1.txt) are all contained in this filename. In some embodiments, the user email (e.g. mal-user-99) is retrieved from a user database at step 704.

In some embodiments, the file that is transferred (e.g. File 1.txt) is stored by a file name of this format in a historical database. The file is stored such that the file and information about its associated data transfer can be quickly retrieved from the historical database when the user-entity is known. Furthermore, the data transfer attributes (e.g. direction and time) can be quickly assessed by examining the name of the file.

In some embodiments, records of every data transfer containing all the attributes of the transfers are stored on a database. In some embodiments, the records contain information that enable the retrieval of the file associated with the data transfer.

At 707, a consolidated file is created. The consolidated file may contain one or more files that the user-entity has attempted to transfer. A historical database is queried for all data transfers associated with the user-entity. When there are one or more entries associated with the user-entity, a consolidated file is created. Each file associated with the user-entity is concatenated to create the consolidated file. The consolidated file may be held in memory and used for a future step and then destroyed. In some embodiments, the file and the metadata associated with the data transfer are determined by querying the user-entity and finding the data entries.

In some embodiments, there are no entries associated with the user-entity. In the case where there are no entries associated with the user-entity, no action occurs (e.g. a consolidated file need not be created) and process 700 proceeds to step 504 of process 500. However, even in this case, the data transfer is recorded, because step 706 still executes.

Referring to the example, when the client device egresses File 1 containing "Ifo" the content of File 1 will be stored and associated with the user-entity of client device and attributes associated with the data transfer. Assuming the client device performs the data transfer of File 2, containing "fou" within the TTL of File 1, File 2 will be concatenated with the stored File 1 and a new consolidated file File 1 &2 will exist in memory. File 1&2 contains "Ifo" and "fou". This concatenated file may be deleted when process 700 ends (i.e. to conserve memory on a file manager). In some embodiments, consolidated files remain in memory after process 700 and are concatenated to produce the necessary consolidated file given the data transfer. Assuming the client device continues after File 2, each time the client attempts a data transfer, a new consolidated file will be created and then deleted when process 700 ends, e.g. File1&2&3, File1&2&3&4, File1&2&3&4&5, . . . . File1&2&3&4&5 . . . &n.

At 708, the created consolidated file is scanned. In some embodiments, the consolidated file is scanned by generating a fingerprint for the consolidated file and determining a similarity between the consolidated file and a plurality of files.

Referring to the example, as the client device continues to exfiltrates File 1, File 2, File 3, etc. then File1&2, File1&2&3, File1&2&3&4, . . . , File1&2&3&4 . . . &n is be generated. In some embodiments, the consolidated file is deleted after performing process 700. In some embodiments, the consolidated file is maintained after each data transfer and used to create the subsequent consolidated file, by concatenating the subsequent requested data.

At step 710, it is determined whether the similarity between the consolidated file and a plurality of files is greater than a threshold. In some embodiments, this step is similar to that of step 508, except the file is a consolidated file. In some embodiments, an intermediate data store is analyzed to make this determination. In some embodiments, a comparison between the sequence of hashes associated with a fingerprint of the consolidated file and a sequence of hashes associated with a file is greater than a similarity threshold. In some embodiments, a comparison between the sequence of hashes associated with the fingerprint of the consolidated file and a sequence of hashes associated with a file is not greater than a similarity threshold.

In response to a determination that a similarity is greater than a threshold, process 700 proceeds to process 714. In response to a determination that a similarity is not greater than a threshold, process 700 proceeds to 712.

At 714, one or more policies are applied. Policies may refer to security policies, such as preventing copying from a file. In some embodiments, the application of policies prevents a client device (e.g. client device 102) from exfiltrating a piece of data from a file database (e.g. file database 122) using a method of consolidating multiple files. In some embodiments, policies may comprise of read, write, and execute policies. For example, an owner of a file (e.g. an entity) may configure a file's policies such that one or more users is restricted from reading, writing, or executing the file.

In some embodiments, policies are specific to a file and may be determined using information associated with a file that is stored on a device executing process 700 (e.g. file manager 112). For example, a group_id may be used to determine if a user-entity associated with a user within a certain group is permitted access to the file. Any information associated with the file can be used to apply policies. In some embodiments, any action or check may be performed on a file. For example, the actions and checks defined by a group_actions (JSON).

In some embodiments, a policy indicates an administrator or other user is to be notified when the similarity threshold is greater than the threshold.

Referring back to the example, assuming that the set threshold is met, policies associated with the file that contains "I found round rings" will be applied to one or more of File 1, File 2, and File 3. In some embodiments, a file manager prevents the client device from exfiltrating files that are part of the whole secret. For example, once it is determined that File 1 and File 2 in combination have a similarity greater than a threshold (i.e. by determining a similarity between consolidated file File 1&2), the exfiltration of File 2 is prevented. In some embodiments, a file manager is configured to alert an administrator that the data transfer of File 1 has occurred, thus allowing the owner of file database to take an action.

In some embodiments, the file manager is configured to prevent the exfiltration of one or more files which when combined exceed a similarity, regardless of the order relative to the original file. For example, if the client device has exfiltrated File 1, the file manager can prevent the exfiltration of any file that will, in combination with File 1, exceed a similarity threshold. To illustrate, if a particular user attempts to exfiltrate File 1, containing "Ifo", File 4 (containing "ndr"), File 3 (containing "oun") etc. the consolidated file File 1&4&3, may exceed a threshold similarity of the original file.

At step 712, removal is permitted. In some embodiments, a file manager permits a client device to remove a part or a whole of a consolidated file from a file database. In some embodiments, the client device is attempting to copy and paste potentially sensitive information from an entity's file database utilizing a piecemeal method (i.e. each part of the file is copied at a different time). Step 712 may permit this action. Step 712 may permit any action pertaining to accessing the file, such as reading, writing, executing, etc. Step 712 may permit ingress or egress of a consolidated file or a part of a consolidated file.

Figure 8:
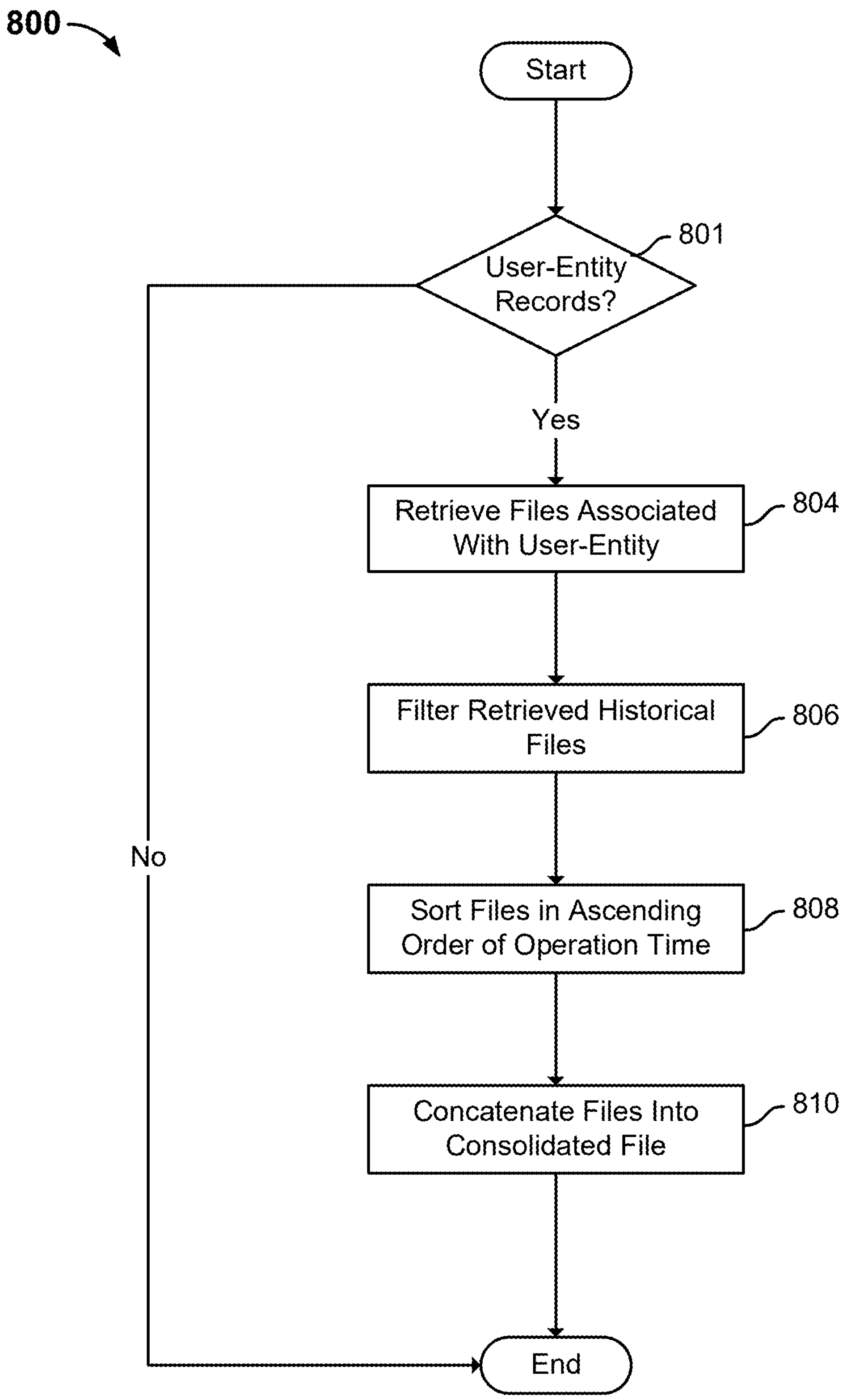
FIG. 8 is a flow diagram illustrating a process to create a consolidated file in accordance with some embodiments.

FIG. 8 is a flow diagram illustrating a process to create a consolidated file in accordance with some embodiments. In some embodiments, process 800 is implemented to perform some or all of step 707 of process 700. Process 800 may be executed on a file manager, such as file manager 112.

At 801, it is determined whether a user-entity contains any associated records. In some embodiments, the entries for the user-entity are found by querying a historical database. In some embodiments, the historical database is queried for all filenames that contain the user-entity. In some embodiments, step 801 is affirmative when there is one or more entries that contain the filename.

Suppose that mal-user-99 is attempting to exfiltrate "I found round rings" using a piecemeal method. First, mal-user-99 exfiltrates File 1 (containing "Ifo"). At a future time, mal-user-99 attempts to exfiltrate File 2 (containing "fou"). At this future time, it is determined that mal-user-99 has a record. In some embodiments, this determination is reached upon finding the record: us-company/EMAIL-mal-user-99-company.com/2024-10-01T14:46:22.001Z_DOWNLOAD_File 1.txt. within the historical database. In some embodiments, this determination is made when a record of a data transfer associated with the user-entity is located. In such embodiments, the file involved with the data transfer may be queried using information stored in the record.

In response to a determination that no records for a user-entity exist, process 800 ends. The process ends because a consolidated file may not need to be created in order to determine a similarity of one data transfer by a particular user-entity. This is because process 500 can be used to perform a similarity check on a single file. In some embodiments, there are no records for a user-entity because TTL has lapsed since the user-entity executed its last data transfer.

In response to a determination that there are one or more records associated with the user-entity, process 800 proceeds to 804.

At 804, the historical files associated with the user-entity are retrieved. In some embodiments, the files are retrieved from a historical database. In some embodiments, the files are retrieved by querying a database for every file that contains the user-entity. In some embodiments, files in the historical database are proactively consolidated using a background process to improve the efficiency of the operation. For example, if there are five historical files, they may be proactively concatenated to reduce the number of concatenations needed to be performed.

Referring back to the example including mal-user-99, when mal-user-99 attempts to copy a File 4 which contains "und', step 806 may yield files with the names: "us-company/EMAIL-mal-user-99-company.com/2024-10-01T14:46:52.001Z_DOWNLOAD_File 1.txt", "us-company/EMAIL-mal-user-99-company.com/2024-10-01T14:55:48.001Z_DOWNLOAD_File 2.txt", and "us-company/EMAIL-mal-user-99-company.com/2024-10-01T15:30:36.054Z_DOWNLOAD_File 3.txt." In some embodiments, step 806 will also yield "us-company/EMAIL-mal-user-99-company.com/2024-10-01T15:40:36.054Z_DOWNLOAD_File 4.txt" because process 800 is executed after step 706.

At step 806, the retrieved historical files are filtered. Step 804 may provide each data transfer for a user-entity, however, some of the data transfers may be deemed irrelevant by the entity that owns the file database. The entity that owns the file database may only want to determine similarities for files that are either downloaded (egressed) or uploaded (ingressed). In some embodiments, the file manager is configured such that only data transfers that are either egress (download) or ingress (upload) is concatenated to the consolidated file. In some embodiments, the file manager is configured such all data transfers (ingress and egress) are concatenated to the consolidated file.

For example, while mal-user-99 is in the process of attempting to exfiltrate the secret "I found round rings", mal-user-99 could upload a legitimate file, e.g. File Legit, to the file database. This data transfer will similarly be stored by the file manager. In this case, in addition to the files returned by step 804, File Legit will also be returned as "us-company/EMAIL-mal-user-99-company.com/2024-10-01T15:14:22.001Z_UPLOAD_File Legit.txt". If the file manager is configured to only determine similarities on downloaded (egressed) files, File Legit will not be concatenated to the consolidated file. On the other hand, if the file manager is configured to determine similarities for both directions, File Legit will be concatenated to the consolidated file.

The filter at step 806 may be applied using any information that is known or can be determined about data transfers. For example, a file manager may be configured to ignore data transfers initiated after a certain time. In some embodiments, the filter is employed to save memory and/or compute power.

At 808, the files are sorted in ascending order of operation time. In some embodiments, at step 804, the order of the files is altered. In some embodiments, step 808 uses the time stamps maintained in each data transfer record to sort the retrieved and filtered files in ascending order.

At 810, the files are concatenated into the consolidated file. In some embodiments, the files are concatenated in the order dictated at step 808. In some embodiments, the consolidated file contains each file associated with the user entity, that have not been filtered, and the requested file which caused the initiation of process 800. Referring back to the example, the consolidated file will contain File 1, File 2, File 3, and File 4.

Figure 9:
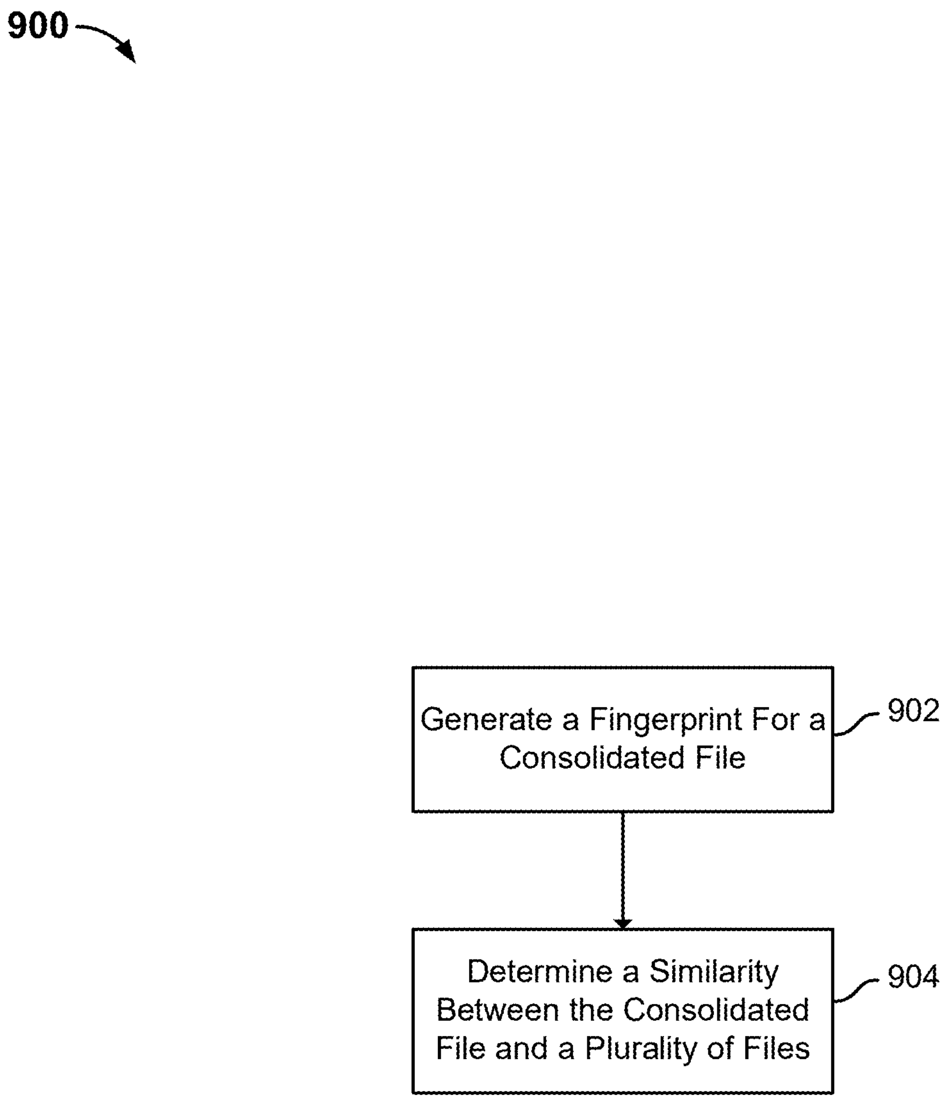
FIG. 9 is a flow diagram illustrating a process to scan a consolidated file in accordance with some embodiments.

FIG. 9 is a flow diagram illustrating a process to scan a consolidated file in accordance with some embodiments. In some embodiments, process 900 is implemented to perform some or all of step 708. Process 900 may be executed on a file manager.

At 902, a fingerprint for a consolidated file is generated. The consolidated file may contain one or more files involved in data transfers initiated by a user-entity. A fingerprint of a consolidated file may consist of a plurality of hashes that comprise the consolidated file and the frequency with which each hash occurs in the consolidated file. In some embodiments, the fingerprint of the consolidated file is generated by process 300. Referring back to the example where File 1 contains "Ifo", File 2 contains "fou", File 3 contains "und", and File 4 contains "ndr", after the files are concatenated into a consolidated file, the fingerprint of the consolidated file will contain hash("Ifo"), hash("fou"), hash("und"), and hash("ndr").

In some embodiments, the files contain more data, but a relevant hash may still be extracted. For example, File 4 may contain "stand rain". In this case, the consolidated file will contain: "Ifo", "fou", "und", "stand rain". After step 902, the fingerprint will contain hash(Ifo), hash("fou"), hash("und"), hash("und"), hash("sta"), hash("and"), hash("ndr"), and hash("ain"). Note the hash("ndr") is still contained within the fingerprint of duplicates file. Therefore, when the similarity between the consolidated file and the plurality of files is determined, hash("ndr") will still contribute to the similarity score.

At 904, a similarity between the consolidated file and a plurality of files is determined. The similarity reflects a comparison between the consolidated file and a plurality of files. The similarity may be determined by comparing the fingerprint of the consolidated file to the plurality of hashes stored by a deduplicated hash index. The comparison may be performed in the memory of a file manager, such as memory 114 of file manager 112. In some embodiments, a check on a deduplicated hash index returns occurrence data associated with a hash.

In some embodiments, a comparison between hashes can be determined using any technique to that determines the similarity between two hashes e.g. winnowing algorithm, k-gram techniques, all-to-all matching etc.

In some embodiments, information associated with the similarities of each hash are stored in an intermediate data store (e.g. the similarities of a hash in a file of file database 122). In some embodiments, the frequency of the hash in the file is stored. In some embodiments, the hash does not appear in any file, thus there is no entry in the deduplicated hash index.

Similarity data may comprise of one or more attributes. Examples of similarity data attributes include, secret_file_id, match frequency, percentage_match. If a hash included in the fingerprint of the consolidated file matches one of the entries of the deduplicated hash index, an intermediate data store is updated to include one or more entries. Each of the one or more entries corresponds to a file of a plurality of files stored in a database that includes the hash. An entry for a matched file includes an identifier of the file, a sum of the frequency of all matched terms between the fingerprint and the hashes associated with the matched file, and a percentage match of the matched frequency terms (e.g., the fingerprint matched X tokens out of a possible number of Y tokens). The entry for the matched file is updated as there are more and more matches between the consolidated file's fingerprint and the hashes associated with the matched file. In some embodiments, a sequence of the hashes associated with the fingerprint is compared to a sequence of the hashes associated with a file included in the deduplicated hash index.

In some embodiments, the similarity generated by process 900 is used in another process such as at step 710 of process 700.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

creating a consolidated file based on a set of data transfer records corresponding to a plurality of temporally distinct data transfer events associated with a user-entity, wherein data transfer records included in the set are concatenated together in temporal order to reconstruct data transferred across the plurality of temporally distinct data transfer events;

generating a fingerprint that includes a plurality of hashes for the consolidated file, wherein the consolidated file comprises data associated with a set of files, and wherein the fingerprint comprises a frequency with which each hash occurs in each file of the set of files;

utilizing a deduplicated hash index to determine a similarity between the consolidated file and a plurality of files based on the generated fingerprint; and performing an action based on the determined similarity.

2. The method of claim 1, further comprising receiving a file.

3. The method of claim 2, further comprising retrieving the user-entity associated with the file.

4. The method of claim 3, wherein the user-entity associated with the file includes an email address, a source internet protocol address, a destination internet protocol address, or a user identifier.

5. The method of claim 2, further comprising storing the file with an associated data transfer record.

6. The method of claim 5, wherein the associated data transfer record contains information indicating the user-entity associated with the file.

7. The method of claim 1, wherein the set of files is a result of filtering a set of historical files.

8. The method of claim 1, wherein the set of historical files are associated with data transfer records associated with a particular user-entity.

9. The method of claim 1, wherein the set of files is filtered based on a direction of a data transfer.

10. The method of claim 1, wherein the data associated with each file of the set of files is sorted in ascending temporal order of an operation on each file.

11. The method of claim 1, wherein the consolidated file is deleted after determining the similarity between the consolidated file and the plurality of files.

12. The method of claim 1, wherein the action includes applying one or more policies to the consolidated file.

13. The method of claim 12, wherein the one or more applied policies are specific to the consolidated file.

14. The method of claim 12, wherein the one or more applied policies are specific to a group to which a user associated with a user-entity belongs.

15. The method of claim 1, wherein the action includes permitting removal of the consolidated file.

16. A system, comprising:

a processor configured to:

create a consolidated file based on a set of data transfer records corresponding to a plurality of temporally distinct data transfer events associated with a user-entity, wherein data transfer records included in the set are concatenated together in temporal order to reconstruct data transferred across the plurality of temporally distinct data transfer events;

generate a fingerprint that includes a plurality of hashes for the consolidated file, wherein the consolidated file comprises data associated with a set of files, and wherein the fingerprint comprises a frequency with which each hash occurs in each file of the set of files;

utilize a deduplicated hash index to determine a similarity between the consolidated file and a plurality of files based on the generated fingerprint; and perform an action based on the determined similarity; and a memory coupled to the processor and configured to provide the processor with instructions.

17. The system of claim 16, wherein the processor is further configured to retrieve the user-entity associated with the consolidated file.

18. The system of claim 17, wherein the user-entity associated with the consolidated file includes an email address, a source internet protocol address, a destination internet protocol address, or a user identifier.

19. A computer program product embodied in a non-transitory computer readable medium and comprising computer instructions for:

creating a consolidated file based on a set of data transfer records corresponding to a plurality of temporally distinct data transfer events associated with a user-entity, wherein data transfer records included in the set are concatenated together in temporal order to reconstruct data transferred across the plurality of temporally distinct data transfer events;

generating a fingerprint that includes a plurality of hashes for the consolidated file, wherein the consolidated file comprises data associated with a set of files, and wherein the fingerprint comprises a frequency with which each hash occurs in each file of the set of files;

utilizing a deduplicated hash index to determine a similarity between the consolidated file and a plurality of files based on the generated fingerprint; and performing an action based on the determined similarity.

* * * * *